United States Patent
Ersoy

(10) Patent No.: US 8,133,381 B2
(45) Date of Patent: Mar. 13, 2012

(54) CASED PIPE INTERNAL CATHODIC PROTECTION APPARATUS AND METHOD

(75) Inventor: Daniel Allen Ersoy, Lincolnwood, IL (US)

(73) Assignee: Gas Technology Institute, Des Plaines, IL (US)

( * ) Notice: Subject to any disclaimer, the term of this patent is extended or adjusted under 35 U.S.C. 154(b) by 182 days.

(21) Appl. No.: 12/791,314

(22) Filed: Jun. 1, 2010

(65) Prior Publication Data

US 2011/0290664 A1    Dec. 1, 2011

(51) Int. Cl.
*C23F 13/06* (2006.01)
(52) U.S. Cl. ........ 205/740; 205/724; 205/730; 205/737; 205/738; 205/739; 204/196.1; 204/196.11; 204/196.18; 204/196.26; 204/196.27; 204/196.3; 204/196.37
(58) Field of Classification Search ............... 204/196.1, 204/196.11, 196.18, 196.26, 196.27, 196.3, 204/196.37; 205/724, 730, 737, 738, 739, 205/740
See application file for complete search history.

(56) References Cited

U.S. PATENT DOCUMENTS

| | | | | |
|---|---|---|---|---|
| H544 H | * | 11/1988 | Castillo et al. | 205/734 |
| 4,940,944 A | * | 7/1990 | Steele et al. | 324/425 |
| 5,026,468 A | * | 6/1991 | Carpenter et al. | 204/196.02 |
| 5,139,634 A | * | 8/1992 | Carpenter et al. | 205/727 |
| 5,144,247 A | * | 9/1992 | Speck | 324/425 |
| 5,469,048 A | * | 11/1995 | Donohue | 324/71.1 |
| 6,238,545 B1 | * | 5/2001 | Allebach et al. | 205/734 |
| 6,773,774 B1 | * | 8/2004 | Crook et al. | 428/34.7 |
| 7,192,513 B2 | * | 3/2007 | Al-Mahrous | 205/730 |
| 2004/0004479 A1 | * | 1/2004 | Flatt et al. | 324/326 |

* cited by examiner

*Primary Examiner* — Bruce Bell
(74) *Attorney, Agent, or Firm* — Mark E. Fejer

(57) ABSTRACT

A method and system for protecting underground gas carrier pipes housed within an outer casing pipe in which a gas carrier pipe section disposed within an outer casing pipe section and having opposed ends is electrically isolated from a remaining gas carrier pipe section proximate each of the ends. An annular space between the gas carrier pipe section and the outer casing pipe section is filled with an electrolyte. At least one anode electrode is inserted into the annular space distal from each of the gas carrier pipe section and the outer casing pipe section and connected with a positive voltage lead of a cathodic protection rectifier. A negative voltage lead of the cathodic protection rectifier is connected to the gas carrier pipe section.

15 Claims, 3 Drawing Sheets

CASED PIPE INTERNAL CATHODIC PROTECTION APPARATUS AND METHOD

BACKGROUND OF THE INVENTION

1. Field of the Invention

This invention relates to a method and apparatus for preventing the corrosion of underground metallic gas carrier pipes, such as natural gas pipelines. More particularly, this invention relates to a method and apparatus for preventing the corrosion of underground metallic gas carrier pipes using cathodic protection. More particularly yet, this invention relates to a method and apparatus for preventing the corrosion of underground metallic gas carrier pipes disposed within an outer casing pipe using cathodic protection.

2. Description of Related Art

The corrosion of metals is the result of electrochemical reactions, that is, chemical reactions accompanied by a flow of electrical current. The electrochemical reactions occur through a combination of chemical reactions in the exchange of electrical charges (current) between areas where these chemical reactions are occurring, in effect, an electrochemical cell. Cathodic protection is a method for preventing the corrosion of metals which utilizes a flow of direct current electricity to interfere with the activity of the electrochemical reactions responsible for the corrosion. Corrosion is prevented by coupling a metal with a more active metal when both are immersed in an electrolyte and connected with an external path. In this case, the metal being protected becomes a cathode electrode.

Every metal disposed in an electrolyte develops an electrochemical potential due to the free energy of the atoms in the metal. To prevent anodic reactions from occurring due to electrochemical reactions on the metal, electrons must be prevented from leaving the metal. Because electrons can only flow from an area of high, negative, potential to an area with lower, negative, potential, connection of the metal to be protected to a source of the more negative electrons effectively prevents the anodic reactions on the metal to be protected, thereby preventing corrosion. In this case, the flow of electrons is from the external source to the metal being protected.

Cased metallic pipe with an open, air filled, annular space cannot be cathodically protected. Since 2002, integrity assessments of "covered segments" of gas transmission lines through the use of in-line inspection, pressure testing, or direct assessment, have been required. When a transmission rated gas line is in a high consequence area, it is required that a baseline assessment be carried out by 2012 followed by an assessment every seven years or sooner.

Most cased pipe sections owned by local distribution companies that fall under the regulations requiring integrity assessments cannot be in-line inspected or pressure tested. Although they can be assessed by direct assessment, the casing around the pipe "shields" the gas carrier pipe from the use of nearly all inspection tools, such as direct current voltage gradient, alternating current voltage gradient, and electromagnetic pipe inspection, e.g. pipeline current mapper. In addition, the most important survey, that is, highest weighted, for direct assessment is the close interval survey which measures the cathodic protection levels on the pipe relative to its surrounding environment. However, the close interval survey cannot be applied to conventional cased pipe sections because they do not have cathodic protection applied.

SUMMARY OF THE INVENTION

It is one object of this invention to provide a method and system for protecting encased metal pipes from corrosion.

It is another object of this invention to provide a method and system for monitoring the applied cathodic protection levels at anytime or continuously.

These and other objects of this invention may be addressed by a method and system for providing corrosion protection to a gas carrier pipe disposed within an outer casing pipe and forming an annular space there between in which a section of the gas carrier pipe is electrically isolated from the remaining sections of the gas carrier pipe. While the gas carrier pipe, by necessity, is metallic, the outer casing pipe may be metallic or non-metallic, e.g. plastic. An anode electrode is provided in the annular space at a distance from each of the electrically isolated gas carrier pipe and the outer casing pipe. A cathodic protection rectifier is provided having a positive voltage lead connected with the anode electrode and having a negative voltage lead connected with the electrically isolated gas carrier pipe. The remaining portion of the annular space is filled with an electrolyte.

In accordance with one embodiment of this invention, a plurality of additional spaced apart electrodes are provided within the annular space at a distance from each of the electrically isolated gas carrier pipe and the outer casing pipe. A voltage meter is provided having one terminal connected with each of the plurality of additional electrodes and having another terminal connected with the electrically isolated gas carrier pipe.

BRIEF DESCRIPTION OF THE DRAWINGS

These and other objects and features of this invention will be better understood from the following detailed description of the drawings, wherein.

DETAILED DESCRIPTION OF THE PRESENTLY PREFERRED EMBODIMENTS

As used herein, the term "metallic" refers to an object comprising at least one metal. The invention disclosed herein is a cathodic protection system or apparatus and method which provides corrosion protection, i.e. prevents corrosion, to the exterior surface of a metallic gas carrier pipe housed within an outer casing pipe, whereby an annular space is formed between the interior surface of the outer casing pipe and the exterior surface of the gas carrier pipe. In accordance with one embodiment, the cathodic protection system or apparatus and method of this invention may also be used to provide corrosion protection to the inner surface of the outer casing pipe.

Figure 1:
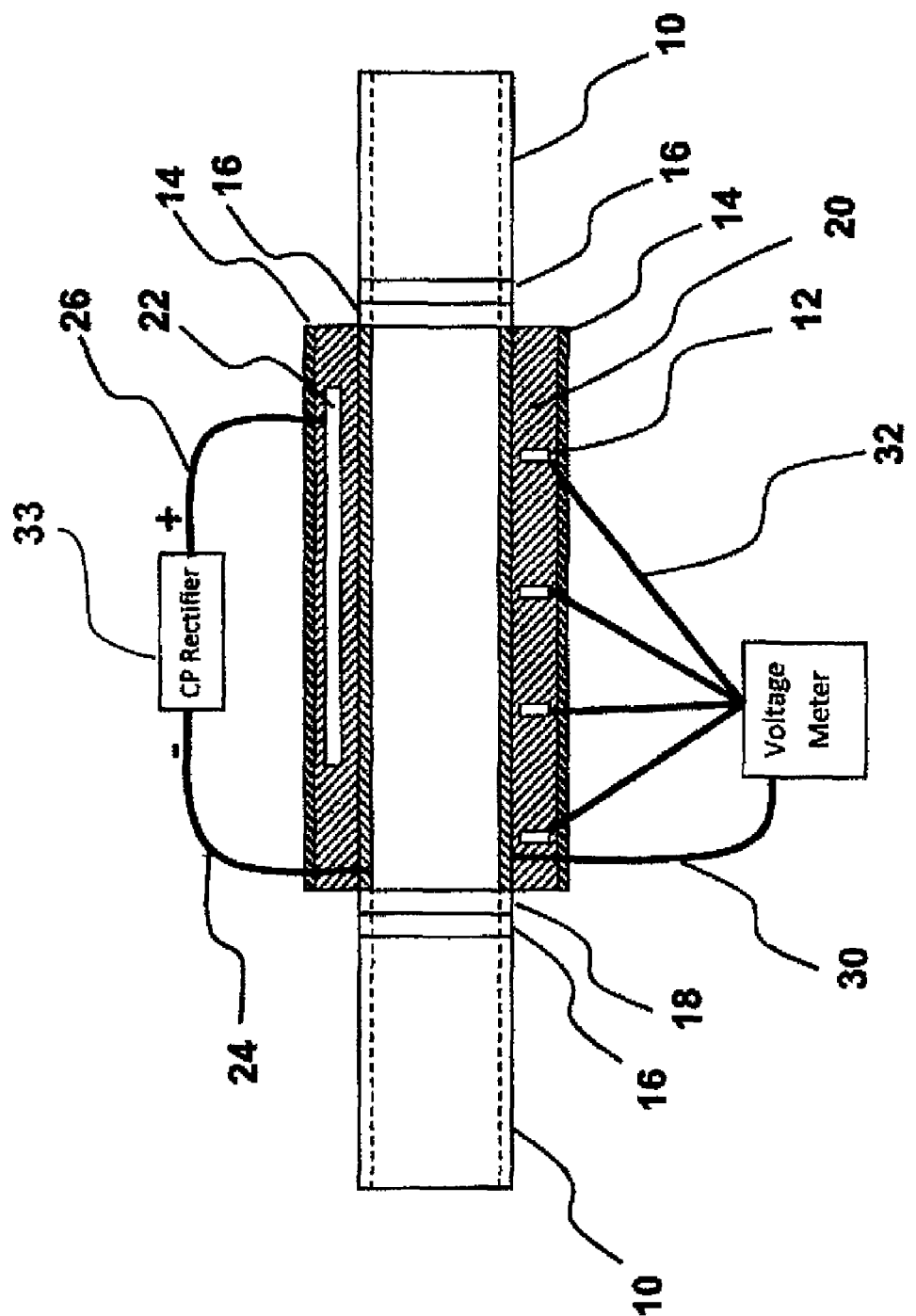
FIG. 1 is a diagrammatic representation of a system for providing corrosion protection to an encased gas carrier pipe in accordance with one embodiment of this invention.

FIG. 1 shows a basic system for preventing corrosion of a metallic gas carrier pipe in accordance with one embodiment of this invention. As shown therein, a gas carrier pipe 10 is disposed within an outer casing pipe section 14, forming an annular space 20 there between. A gas carrier pipe section 18 of the gas carrier pipe 10 is electrically isolated by electrical isolation means disposed at each end of the pipe section. In accordance with one embodiment of this invention, the electrical isolation means are in the form of an isolation fitting or flange 16 connecting the ends of the electrically isolated gas carrier pipe section 18 with the remaining sections of the gas carrier pipe 10. However, any means suitable for electrically isolating the gas carrier pipe section from the remaining sections of gas carrier pipe may be employed. At least one anode electrode 22 is disposed within the annular space 20 at a distance from each of the outer casing pipe section 14 and the gas carrier pipe section 18. In addition, in accordance with one preferred embodiment of this invention, a plurality of additional spaced apart electrodes 12 are also disposed at various locations around the gas carrier pipe section 18 within the annular space 20. The portion of the annular space not occupied by the electrodes is filled with a solid or liquid electrolyte. Suitable electrodes for use in the method and system of this invention include, but are not limited to, graphite anodes (carbon and ash), mixed metal oxide anodes, high silicon cast iron (normally 14-15% Si), and platinum and platinized-niobium. Suitable electrolyte materials for use in the system and method of this invention include, but are not limited to, polymer electrolytes, water-based electrolytes, coal coke breeze, calcined petroleum coke breeze, and natural or man-made graphite particles. The system further comprises a voltage meter operably connected by leads 32 to the plurality of additional electrodes 12 and operably connected by lead 30 to the gas carrier pipe section 18 to provide cathodic protection potentials to determine protection status/levels. The system further comprises a standard cathodic protection system, that is, a cathodic protection rectifier 33 having a positive voltage lead 26 connected with the anode electrode 22 and a negative voltage lead 24 connected with the gas carrier pipe section 18. By placing permanent electrodes within the annular space close to the gas carrier pipe, periodic cathodic protection level readings may be taken to monitor the cathodic protection effectiveness and ensure a non-corrosive situation for the gas carrier pipe and the inner surface of the outer casing pipe. In accordance with this embodiment of the system of this invention, no cathodic protection is provided to the outer casing pipe section due to the electrical isolation of the outer casing pipe section from the gas carrier pipe section.

Figure 2:
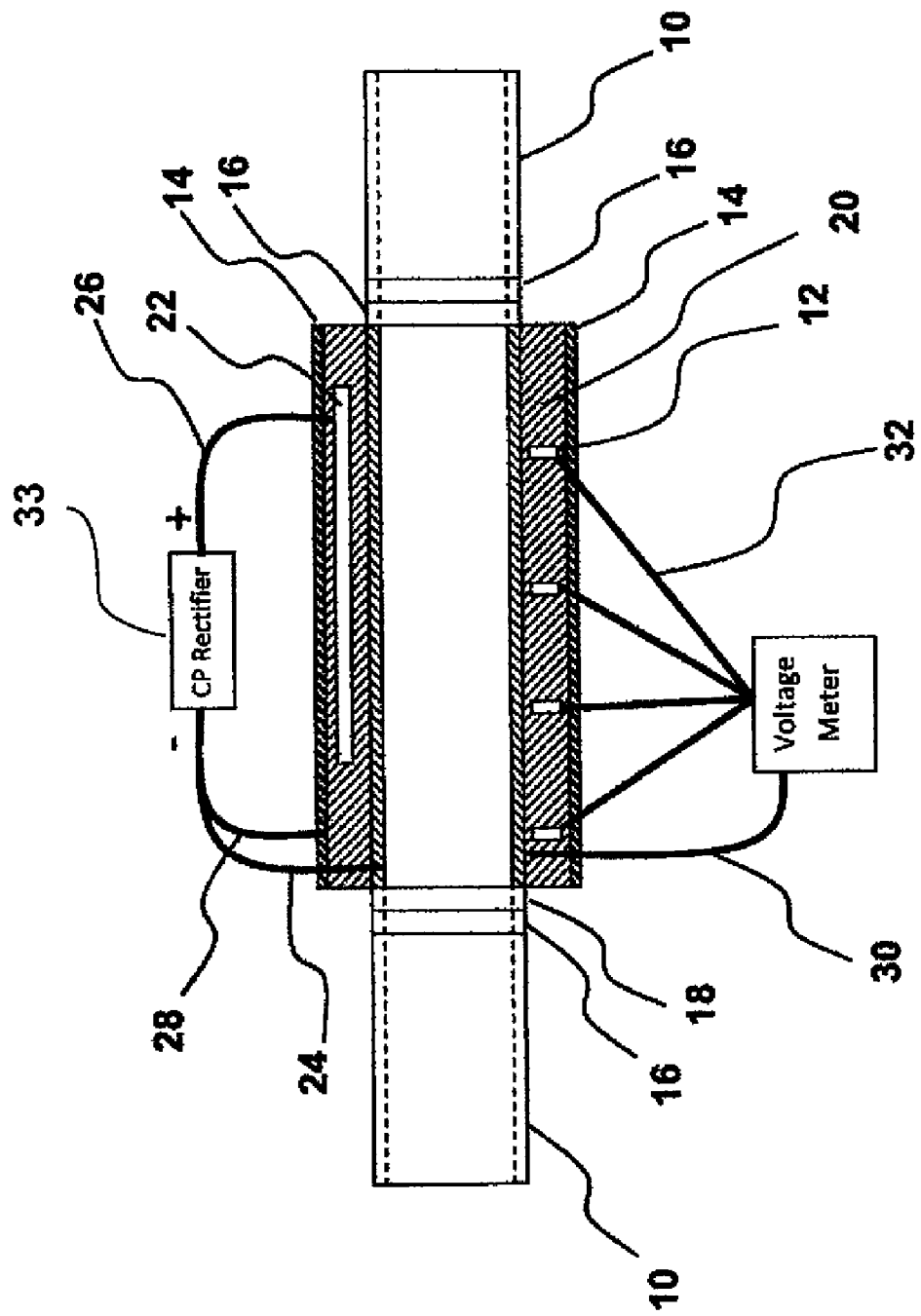
FIG. 2 is a diagrammatic representation of a system for providing corrosion protection to an encased gas carrier in accordance with another embodiment of this invention.

In accordance with one embodiment of this invention as shown in FIGS. 1 and 2, the outer casing pipe section 14 is electrically isolated from the gas carrier pipe section, thereby providing an option for cathodic protection of the inside surface of the outer casing pipe from corrosion. As shown in FIG. 2, the cathodic protection rectifier 33 is connected by an additional negative voltage lead 28 to the outer casing pipe section 14, thereby providing cathodic protection for both the gas carrier pipe section and the outer casing pipe section from corrosion.

Figure 3:
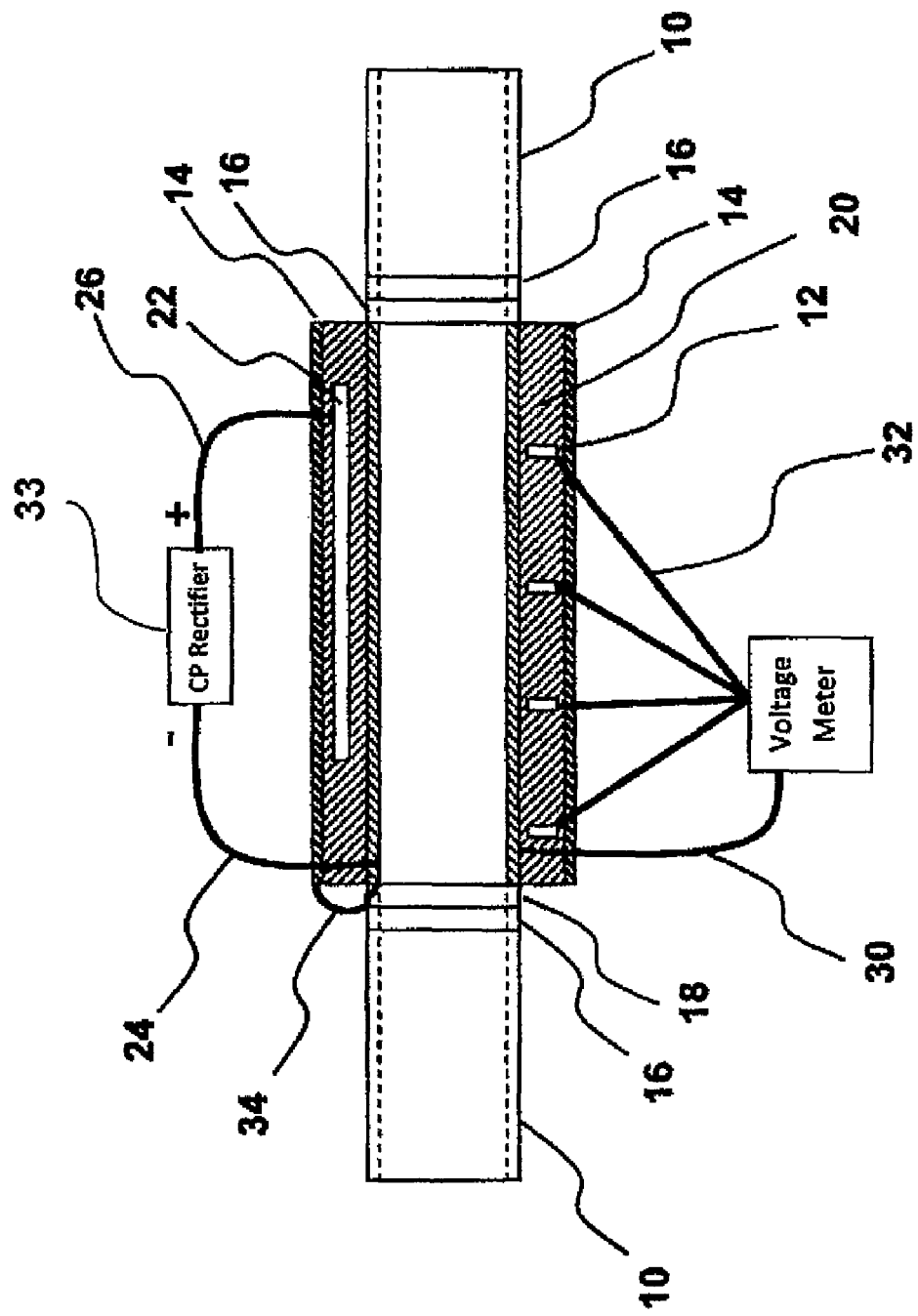
FIG. 3 is a diagrammatic representation of a system for providing corrosion protection to an encased gas carrier pipe in accordance with yet another embodiment of this invention.

FIG. 3 shows a system in accordance with another embodiment of this invention in which the outer casing pipe section 14 is electrically shorted by shorting means, shown as reference 34, with gas carrier pipe section 18, thereby providing cathodic protection to both the gas carrier pipe section and the outer casing pipe section 14, but without a negative connection between the outer casing pipe itself and the cathodic protection rectifier. Suitable shorting means are any electrically conductive materials, for example, metallic wires or straps, which connect the gas carrier pipe section with the outer casing pipe section.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

What is claimed is:

1. In an underground gas transmission system comprising a gas carrier pipe disposed within an outer casing pipe and forming an annular space there between, a method for providing corrosion protection to said gas carrier pipe comprising the steps of:
   electrically isolating a gas carrier pipe section disposed within an outer casing pipe section and having opposed ends from a remaining gas carrier pipe section proximate each of said ends;
   filling said annular space with an electrolyte;
   inserting at least one anode electrode into said annular space distal from each of said gas carrier pipe section and said outer casing pipe section;
   connecting a positive voltage lead of a cathodic protection rectifier to said anode electrode; and
   connecting a negative voltage lead of said cathodic protection rectifier to said gas carrier pipe section.

2. The method of claim 1 further comprising inserting a plurality of additional spaced apart electrodes in said annular space distal from each of said gas carrier pipe section and said outer casing pipe section, connecting one terminal of a voltmeter having two terminals to each of said additional electrodes, and connecting the other terminal of said voltmeter to said gas carrier pipe section.

3. The method of claim 1, wherein said outer casing pipe section is electrically isolated from said gas carrier pipe section.

4. The method of claim 3 further comprising connecting said negative voltage lead of said cathodic protection rectifier to said outer casing pipe section.

5. The method of claim 1 further comprising connecting said gas carrier pipe section with said outer casing pipe section, thereby creating an electrical short.

6. The method of claim 1, wherein at least one cathodic protection measurement is made to determine a cathodic protection effectiveness.

7. A system for providing corrosion protection to a gas carrier pipe disposed within an outer casing pipe comprising:
   a gas carrier pipe section having opposed ends;
   an outer casing pipe section disposed around said gas carrier pipe section, forming an annular space there between;
   gas carrier pipe isolation means for electrically isolating said gas carrier pipe section from a remaining gas carrier pipe section proximate each of said ends;
   an anode electrode disposed in said annular space distal from each of said gas carrier pipe section and said outer casing pipe section;
   a plurality of additional spaced apart electrodes disposed within said annular space distal from each of said gas carrier pipe section and said outer casing pipe section;
   an electrolyte filling said annular space;
   a voltmeter having one terminal connected with each of said additional electrodes and having another terminal connected with said gas carrier pipe section; and
   a cathodic protection rectifier having a positive voltage lead connected with said anode electrode and having a negative voltage lead connected with said gas carrier pipe section.

8. The system of claim 7 further comprising outer casing pipe isolation means for electrically isolating said outer casing pipe section disposed around said gas carrier pipe section from said ends of said gas carrier pipe section.

9. The system of claim 8 further comprising a second negative voltage lead connecting said cathodic protection rectifier with said outer casing pipe section.

10. The system of claim 7 further comprising shorting means for electrically shorting said gas carrier pipe section to said outer casing pipe section.

11. A system for providing corrosion protection to a gas carrier pipe disposed within an outer casing pipe comprising:

a gas carrier pipe section having opposed ends;

an outer casing pipe section disposed around said gas carrier pipe section, forming an annular space there between;

gas carrier pipe isolation means for electrically isolating said gas carrier pipe section from a remaining gas carrier pipe section proximate each of said ends;

an anode electrode disposed in said annular space distal from each of said gas carrier pipe section and said outer casing pipe section;

an electrolyte filling said annular space; and a cathodic protection rectifier having a positive voltage lead connected with said anode electrode and having a negative voltage lead connected with said gas carrier pipe section.

12. The system of claim 11 further comprising a plurality of additional spaced apart electrodes disposed within said annular space distal from each of said gas carrier pipe section and said outer casing pipe section and a voltmeter having one terminal connected with each of said additional electrodes and having another terminal connected with said gas carrier pipe section.

13. The system of claim 11 further comprising outer casing pipe isolation means for electrically isolating said outer casing pipe section disposed around said gas carrier pipe section from said ends of said gas carrier pipe section.

14. The system of claim 13 further comprising a second negative voltage lead connecting said cathodic protection rectifier with said outer casing pipe section.

15. The system of claim 11 further comprising shorting means for electrically shorting said gas carrier pipe section to said outer casing pipe section.

* * * * *